Sept. 15, 1931. J. C. HOFFMAN 1,823,101
TRUNK SUPPORT FOR AUTOMOBILES
Filed May 13, 1930
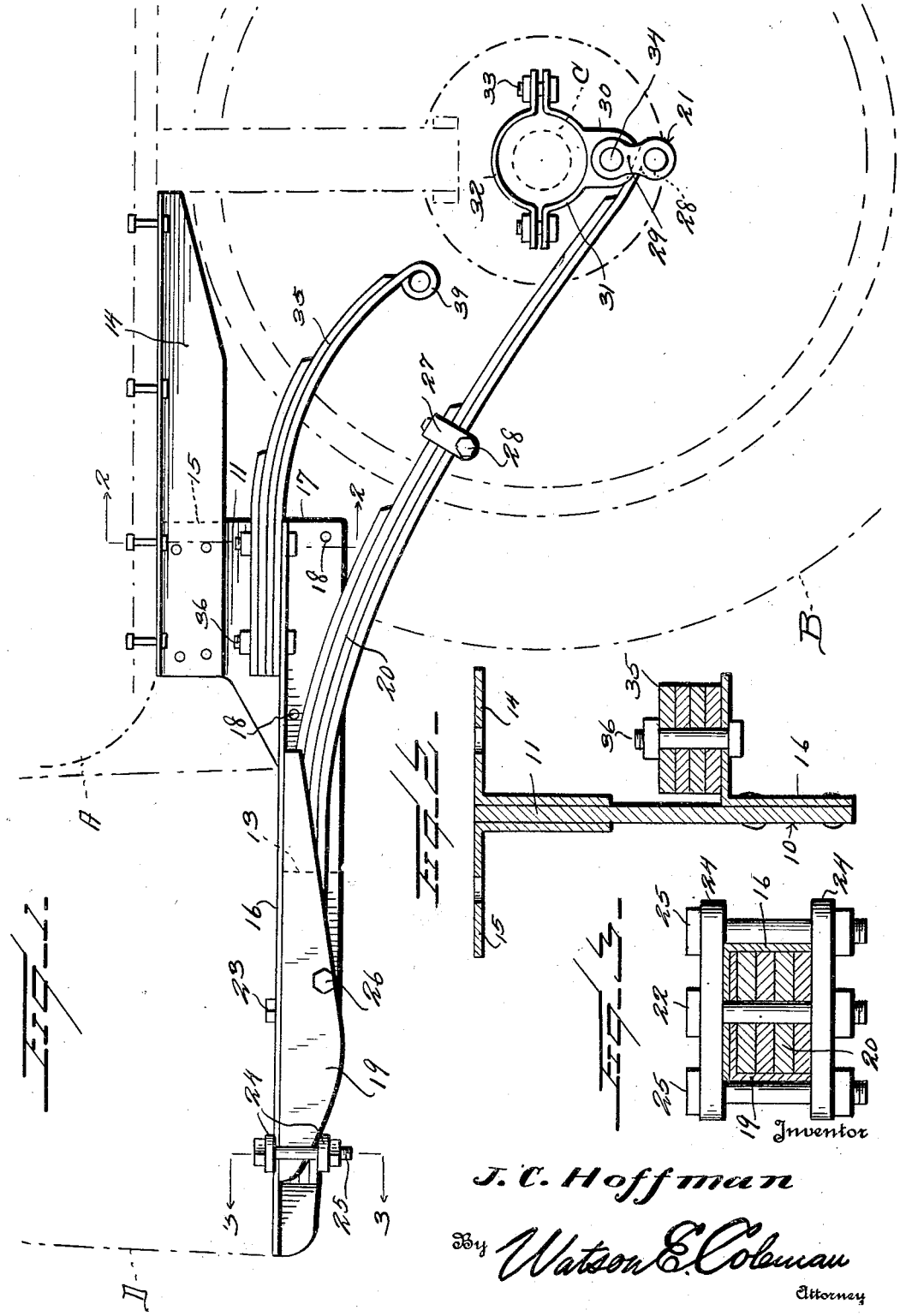
Inventor
J. C. Hoffman
By Watson E. Coleman
Attorney Patented Sept. 15, 1931

1,823,101

UNITED STATES PATENT OFFICE

JOHN C. HOFFMAN, OF SIOUX CITY, IOWA

TRUNK SUPPORT FOR AUTOMOBILES

Application filed May 13, 1930. Serial No. 452,038.

This invention relates to trunk supports adapted to be mounted upon the rear end of an automobile and while I do not wish to be limited to this, the construction is particularly adapted for use with Ford automobiles.

The general object of my invention is to provide an attachment which may be bolted to the back of an automobile and which will so support the trunk as not to affect the riding comfort to the car.

A further object is to provide a construction of this character which will take care of any over-load by the provision of extra springs which come into action when the main springs have been deflected a predetermined distance and which is particularly adapted for use when the trunk is extended.

My invention is illustrated in the accompanying drawings, wherein:—

Figure 1 is a side elevation of a trunk rack constructed in accordance with my invention, applied to a motor car;

Figure 2 is a section on the line 2—2 of Figure 1;

Figure 3 is a section on the line 3—3 of Figure 1.

In these drawings, A designates the body of a car and B the wheels thereof, while C designates the rear axle. My attachment comprises two brackets, one disposed on each side of the car and bolted thereto, these brackets each carrying supporting springs which are operatively engaged with the axle of the car, as will be more fully hereafter described.

Each bracket consists of a plate 10 having at its rear end an upright portion 11, the plate being relatively heavy and extending forward as at 13. Riveted to this plate on one side is the relatively long angle single iron 14 which extends beyond the plate and riveted to the opposite side of the plate, that is, the inside face thereof is the relatively short angle iron 15. These angle irons are provided with bolt holes whereby they may be bolted to the body of the car, to the chassis or to any other suitable point.

Bolted to the outside face of the extension 13 of plate 10 is an angle iron 16 which extends to the rear edge 17 of the plate 11. This angle iron is riveted at a plurality of points as at 18 to the plate 10. Disposed to extend beneath the upper flange of the angle iron 16 is an angle iron 19 which extends from a point adjacent the extremity of the angle iron 16 rearward to any desired extent. Preferably, however, the angle iron 19 terminates short of the upwardly extending portion 11 of the plate 10. Preferably the lower edge of this angle iron is curved.

Disposed between the vertical flanges of the angle irons 16 and 19 are the leaves 20 of a leaf spring, these leaves terminating at the rearward extremity of the angle iron 19 and extending downward and rearward to a point beneath the axle to which they are connected by a shackle 21. These leaves are clamped within the angle irons 16 and 19 by means of bolts 22 and 23 passing through the leaves and through the horizontal flanges of the angle irons and at their extremities, these springs are clamped between cross bars 24 through which the bolt 22 passes and through which exterior bolts 25 pass, thus clamping the springs and the two angle irons securely together at their rear ends. A transverse bolt 26 passes through the vertical flanges of the angle irons 16 and 19 and beneath the springs and contacts therewith.

The spring leaves 20 are successively shorter in length, the lowest leaf being the longest. These spring leaves are clamped together by an intermediate U-shaped clamp 27 having a transverse bolt 28. One or two of the spring leaves extend beyond the clamp 27 and the lowest leaf is formed with an eye 28. Bolted to this eye are the two upwardly extending shackle links 29 which embrace ears 30 formed with the lower half 31 of a clamping collar. The upper half 32 of this clamping collar is bolted to the lower half by bolts 33. This clamping collar is adapted to engage around the axle C. A transverse pivot 34 passes through the upper ends of the links 29 and the ears 30. Thus this axle, shackle or collar is pivotally connected to the extremity of the spring formed by the spring leaves 20.

Bolted to the rear end of the upper flange of the angle iron 16 are a series of spring leaves 35 held in place by the bolts 36, these leaves decreasing in length, the lowest leaf being the longest and the lowest leaf being formed with an eye 39.

This auxiliary spring 35 is normally disposed above the spring 20, but when any excess weight depresses the springs 20 unduly, the extremity 39 of the spring 35 will bear upon the upper face of the spring 20 and this auxiliary spring will thus come into action to resist any downward movement of the supporting bracket and of the trunk.

The trunk D may be either a non-extensible trunk or an extensible trunk and under ordinary circumstances with an ordinary load in the trunk D, the springs 20 will resiliently support the trunk and yieldingly resist shocks and jars but where the trunk is extended, or carries such a heavy load that the brackets will sag, then the short springs 35 will come into action and rest on the long springs and take care of this extra weight. The combination of springs which I have disclosed is capable of use in any make of car.

While the instant design is made with particular reference to the Ford car, obviously many changes might be made in the details of construction and arrangements of parts without departing from the spirit of the invention which would fit this particular support to other makes of cars.

It is to be understood that by the term "body" I refer not only to the body proper but to the framework supporting the body and which is supported by springs from the axle and the brakes may be attached either to the body directly or to the framework supporting the body.

I claim:—

1. The combination with an automobile having a body and a rear axle, of a pair of brackets attached to the body and extending rearward therefrom, a set of leaf springs attached adjacent their rear ends to the rear portions of the brackets and extending downward and forward, and clamps engaging the axle of the automobile and pivotally engaging the forward ends of said springs.

2. The combination with an automobile, of brackets connected to the body of the automobile and extending rearward therefrom, springs connected to the rear axle of the automobile and resiliently supporting the brackets against depression under a load, and auxiliary springs mounted upon the forward ends of the brackets and engaging with the first named springs when the brackets are depressed under a predetermined load.

3. The combination with an automobile, having a body and a rear axle, brackets attached to the body and extending rearward therefrom and adapted to support a trunk, springs attached at their rear ends to the rear ends of the brackets and extending downward and forward and operatively connected at their forward ends to the rear axle of the car, and auxiliary springs attached to the forward ends of the brackets and projecting downward and forward therefrom, normally spaced from the main springs, but engageable with said main springs when the bracket is depressed beyond a certain point under load.

4. A trunk supporting attachment for automobiles, comprising a bracket having a body engaging portion and a depressed portion extending rearward therefrom and including a construction forming a spring receiving channel, a downwardly and forwardly extending spring disposed as its rearward end within said channel and bolted thereto, the forward portion of the spring extending normally down below said channel and at its forward end carrying an axle clamp.

5. A trunk supporting attachment for automobiles, comprising a bracket having a body engaging portion and a depressed portion extending rearward therefrom and including a construction forming a spring receiving channel, a downwardly and forwardly extending spring disposed at its rear end within said channel and bolted thereto, the forward portion of the spring extending normally down below said channel and at its forward end carrying an axle clamp, and an auxiliary spring mounted upon the forward end of the depressed portion of the bracket and extending downward and forward therefrom and adapted to engage with the upper surface of the first named spring when the bracket is depressed beyond a predetermined point under load.

6. A trunk supporting attachment for automobiles, including a bracket formed of a metallic plate having its rearward portion disposed on a plane below the forward portion, the forward portion of the plate having lateral flanges, an angle iron attached to the rear portion of the plate and projecting rearward therefrom, and having a horizontal flange, an opposed angle iron having its horizontal flange disposed beneath the first named flange and having a vertical flange opposed to the vertical flange of the first named angle iron to thereby form a channel, a series of leaf springs disposed within the channel so formed and said springs being clamped within the channel at their rear ends, said leaf springs extending downward and forward, the forward ends of the springs carrying an axle engaging collar.

7. A trunk supporting attachment for automobiles, including a bracket formed of a metallic plate having its rearward portion disposed on a plane below the forward portion, the forward portion of the plate having lateral flanges, an angle iron attached to the rear portion of the plate and projecting rearward therefrom, and having a horizontal flange, an opposed angle iron having its horizontal flange disposed beneath the first named flange and having a vertical flange opposed to the vertical flange of the first named angle iron to thereby form a channel, a series of leaf springs disposed within the channel so formed and clamped within the channel at their rear ends, the leaf springs extending downward and forward, the forward ends of the springs carrying an axle engaging collar, the forward portion of the first named angle iron extending forward beneath the elevated portion of the plate, and leaf springs attached to the forward extension of the angle iron and extending downward and forward and toward but in normally spaced relation to the upper face of the first named spring but adapted to engage therewith when the bracket is depressed beyond a certain point.

In testimony whereof I hereunto affix my signature.

JOHN C. HOFFMAN.